United States Patent
Yu et al.

(10) Patent No.: US 9,246,668 B1
(45) Date of Patent: Jan. 26, 2016

(54) UNIFIED CONTROL FOR DIGITAL TIMING RECOVERY AND PACKET PROCESSING

(71) Applicant: MARVELL INTERNATIONAL LTD., Hamilton (BM)

(72) Inventors: Mao Yu, San Jose, CA (US); Ming Ta Lin, San Jose, CA (US); Sergey Timofeev, Mountain View, CA (US)

(73) Assignee: MARVELL INTERNATIONAL LTD. (BM)

( * ) Notice: Subject to any disclaimer, the term of this patent is extended or adjusted under 35 U.S.C. 154(b) by 24 days.

(21) Appl. No.: 14/205,594

(22) Filed: Mar. 12, 2014

Related U.S. Application Data

(60) Provisional application No. 61/777,964, filed on Mar. 12, 2013.

(51) Int. Cl.
*H04L 7/00* (2006.01)
*H04L 7/02* (2006.01)

(52) U.S. Cl.
CPC ........................................ *H04L 7/02* (2013.01)

(58) Field of Classification Search
CPC ................... H04L 2027/0067; H04L 27/2657; H04L 2027/0036; H04L 5/023; H04L 7/0029; H04L 7/02
USPC ................. 375/355, 354, 326, 362, 375, 371; 714/776; 370/509, 510
See application file for complete search history.

(56) References Cited

U.S. PATENT DOCUMENTS

| 8,049,983 B1 * | 11/2011 | Han et al. ........................ 360/51 |
| 2007/0127600 A1 * | 6/2007 | Sato et al. ..................... 375/327 |

* cited by examiner

*Primary Examiner* — Rahel Guarino

(57) ABSTRACT

Systems, methods, and other embodiments associated with unified control of timing recovery and packet processing are described. According to one embodiment, a method for performing unified control of timing recovery and packet processing is provided. The method includes sampling a received signal according to an ADC timing signal to produce a sequence of samples. The received signal corresponds to a packet and was transmitted according to a transmit timing signal. The method includes determining a phase offset between the ADC timing signal and the transmit timing signal and identifying, based, at least in part, on the phase offset, a data portion of the sequence of samples that contains data encoded in the received signal. A re-generated sample sequence that adjusts the data portion based on the phase offset is calculated.

18 Claims, 7 Drawing Sheets

UNIFIED CONTROL FOR DIGITAL TIMING RECOVERY AND PACKET PROCESSING

CROSS REFERENCE TO RELATED APPLICATIONS

This patent disclosure claims the benefit of U.S. Provisional Application Ser. No. 61/777,964 filed on Mar. 12, 2013, which is hereby wholly incorporated by reference.

BACKGROUND

In wireless communication, the clocks in the transmitter and receiver are not always the same. To properly detect data in a received signal, the timing of the receiver is synchronized with the incoming signal. This process is called timing recovery.

SUMMARY

In general, in one aspect this specification discloses an apparatus that provides unified control of timing recovery and packet processing. The apparatus includes an analog to digital converter (ADC), unified control logic, processing control logic, and timing recovery logic. The (ADC) is configured to sample a received signal according to an ADC timing signal to produce a sequence of samples. The received signal corresponds to a packet and was transmitted according to a transmit timing signal. The unified control logic is configured to determine a phase offset between the ADC timing signal and the transmit timing signal. The processing control logic is configured to identify based, at least in part, on the phase offset, a data portion of the sequence of samples that contains data encoded in the received signal. The timing recovery logic is configured to calculate a re-generated sample sequence that adjusts the data portion based on the phase offset.

In general, in another aspect, this specification discloses a method for performing unified control of timing recovery and packet processing. The method includes sampling a received signal according to an ADC timing signal to produce a sequence of samples. The received signal corresponds to a packet and was transmitted according to a transmit timing signal. The method includes determining a phase offset between the ADC timing signal and the transmit timing signal and identifying, based, at least in part, on the phase offset, a data portion of the sequence of samples that contains data encoded in the received signal. A re-generated sample sequence that adjusts the data portion based on the phase offset is calculated.

In general, in another aspect, this specification discloses an integrated circuit that provides unified control of timing recovery and packet processing. The integrated circuit includes an ADC, unified control logic, processing control logic, a selector, and an interpolator. The ADC is configured to input a received signal that corresponds to a series of packets and was transmitted according to a transmit timing signal; sample the received signal according to an ADC timing signal; and output a resulting sequence of samples.

The unified control logic is configured to input an estimated frequency offset between the ADC timing signal and the transmit timing signal; accumulate the frequency offset estimate with prior frequency offsets; and output i) a phase offset corresponding to the accumulated frequency offset and ii) a shift signal when the phase offset exceeds a threshold. The processing control logic is configured to input the shift signal; identify based, at least in part, on the shift signal, a data portion of the sequence of samples that contains data encoded in the received signal; and output the data portion to a delay line that stores n consecutive samples.

The selector is configured to input the shift signal; select a set of consecutive data samples from the delay line, based, at least in part, on the shift signal; and output the set of consecutive data samples. The interpolator is configured to input the phase offset and the set of consecutive data samples; interpolate the set of consecutive data samples based, at least in part on the phase offset to produce an interpolated data sample; and output the interpolated data sample as part of a re-generated sample sequence.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Two different approaches to timing recovery are analog phase timing recovery and digital timing recovery. In analog phase timing recovery, the timing signal for a receiver's analog to digital converter (ADC) is synchronized to track the timing of the incoming signal. Analog phase timing recovery has many drawbacks. Having to adjust the ADC's timing signal greatly complicates the process of integrating a system-on-chip because different ADCs may have different interface timing. Analog phase timing recovery uses an analog clock phase interpolator, which can be complex to design and difficult to adapt to changing technology. In addition, the resolution of the analog phase interpolator is highly correlated to hardware cost.

Digital timing recovery uses a digital interpolator rather than an analog interpolator, resulting in a lower cost, more flexible, and higher resolution solution. The digital interpolator adjusts a sequence of data samples based on a phase offset that is calculated with respect to a fixed ADC timing signal. With digital timing recovery, advanced features like time stamping, can be made available. However, when a digital interpolator is used, the samples needed to be input to the interpolator may be greater in number than the number of samples in a received packet. To compensate for this possibility, some digital timing recovery systems add large buffers and/or a second clock for the digital interpolator that is faster than the ADC timing signal. Buffers utilize precious area in a system-on-chip and providing a second clock increases power consumption, reducing the benefit of using digital timing recovery.

Described herein are examples of systems, methods, and other embodiments that provide unified control of packet processing and digital timing recovery. By unifying control of the digital timing recovery interpolator and packet processing, the same fixed ADC timing signal can be used for digital timing recovery and packet processing without needing a large buffer or a second clock.

Figure 1:
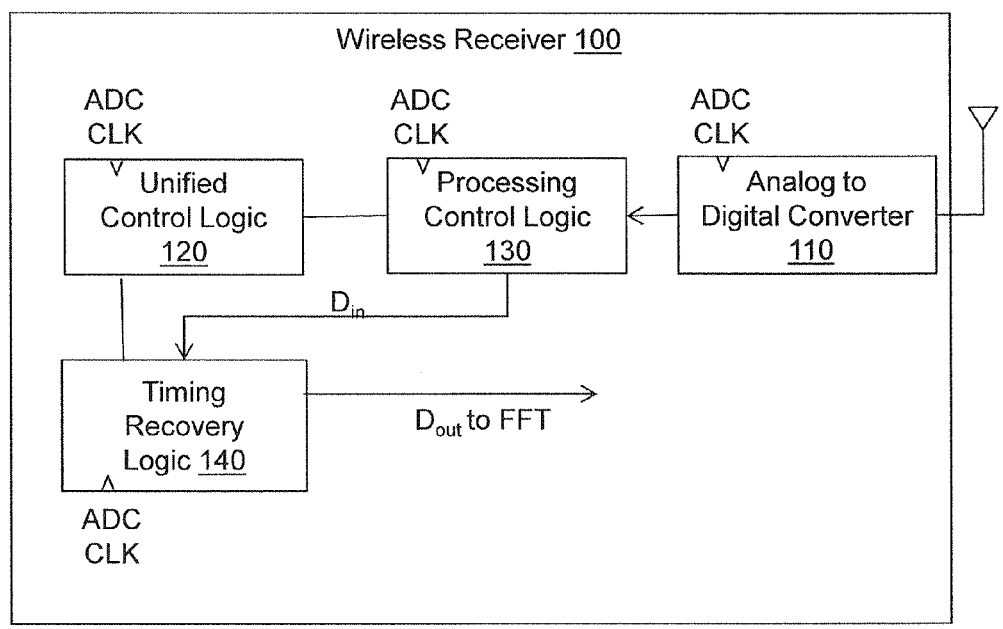
FIG. 1 illustrates one embodiment of an apparatus associated with unified control of digital timing recovery and packet processing.

FIG. 1 illustrates one embodiment of a wireless receiver 100 that controls both packet processing and timing recovery based on the same phase offset that is determined with respect to a fixed ADC timing signal. The wireless receiver 100 includes an ADC 110, unified control logic 120, processing control logic 130, and timing recovery logic 140. All four of these components are timed according to the same ADC timing signal (e.g., the ADC clock). The wireless receiver 100 is configured to receive a signal that corresponds to a packet and that was transmitted according to a transmit timing signal.

The ADC 110 samples a received signal according to an ADC timing signal generated by the ADC clock to produce a sequence of samples. The ADC timing signal is selected to be the same as the transmit timing signal. However, there is typically some frequency offset between the ADC timing signal and the transmit timing signal which needs to be compensated for by the timing recovery logic 140. The unified control logic 120 determines a phase offset between the ADC timing signal and the transmit timing signal. The unified control logic 120 controls both the processing control logic 130 and the timing recovery logic 140 based on the phase offset.

The received signal corresponds to series of packets. Each packet includes a guard interval of some set length followed by encoded data. The sequence of samples produced by the ADC for each packet thus includes some number of samples corresponding to the guard interval that should not be sent for processing related to decoding the data. The samples that follow the guard interval samples are data samples corresponding to the encoded data. The data samples are followed by guard interval samples from the next packet. The processing control logic 130 identifies based, at least in part, on the phase offset, a data portion of the sequence of samples that contains the data samples. The processing control logic 130 provides the data portion, denoted $D_{in}$, to the timing recovery logic 140.

The timing recovery logic 140 calculates a re-generated sample sequence that adjusts the data samples in $D_{in}$ based on the phase offset provided by the unified control logic 120 to compensate for the timing difference between the received signal and the ADC timing signal. The output of the timing recovery logic 140, denoted $D_{out}$, is sent for further processing (e.g., Fast Fourier Transform) related to decoding data in the received signal.

Figure 2:
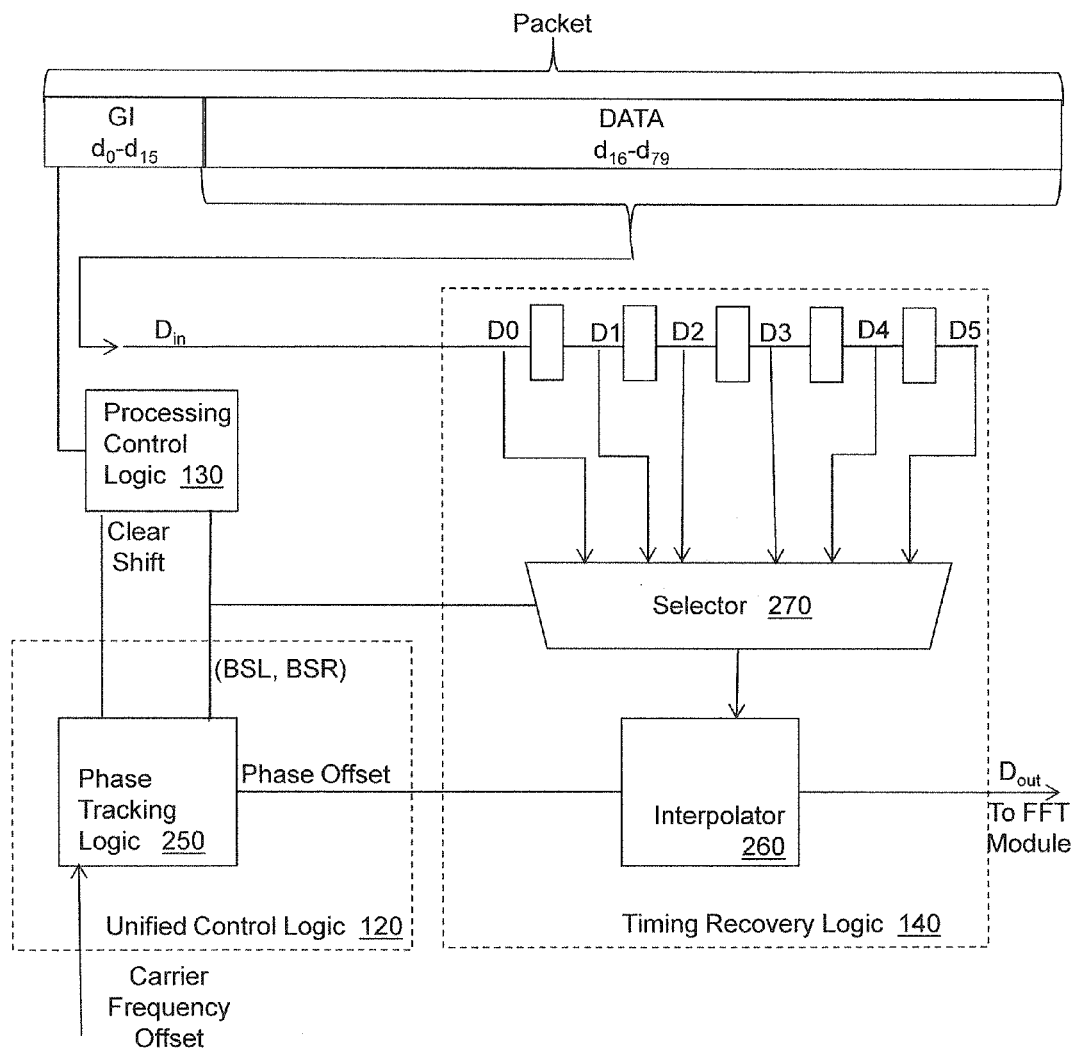
FIG. 2 illustrates another embodiment of an apparatus associated with unified control of digital timing recovery and packet processing.

FIG. 2 illustrates, in more detail, one embodiment of the unified control logic 120, the processing control logic 130, and the timing recovery logic 140. The unified control logic 120 includes a phase tracking logic 250 that determines the phase offset based, at least in part, on a frequency offset estimate. In one embodiment, the frequency offset estimate is derived from a carrier frequency offset that is calculated by other components in the receiver. Carrier frequency offset results from a mismatch of the carrier frequencies (e.g., local oscillators) at the transmitter and the receiver. When the digital clock and the carrier frequency are derived from the same source on both the transmitter and receiver, as is the case with many modern wireless communication devices, there is a deterministic relationship between timing offset and carrier frequency offset. Thus, the carrier frequency offset can be used to derive the frequency offset estimate.

The phase tracking logic 250 determines the phase offset by accumulating the frequency offset estimate. The phase offset is an input to the timing recovery logic 140 as will be described in more detail below. The phase tracking logic 250 also generates a shift signal designated in FIG. 2 as BSL (base sample left shift) and BSR (base sample right shift). In one embodiment, when both BSL and BSR are zero, the shift signal has a value of neutral. The shift signal is changed from neutral by the phase tracking logic 250 when a magnitude of the accumulated phase offset exceeds a threshold (e.g., a full ADC clock cycle). When the accumulated phase offset exceeds the threshold and is positive, the phase tracking logic 250 sets BSL to one, corresponding to a value of left. When the accumulated phase offset exceeds the threshold and is negative, the phase tracking logic 250 sets BSR to one, corresponding to a value of right. BSL and BSR are not both set to one at any given time.

The shift signal is input to the processing control logic 130. The processing control logic 130 identifies the data portion within the sequence of samples from the ADC based on the shift signal. An example packet is depicted at the top of FIG. 2. The packet includes a sequence of 80 samples $d_0$-$d_{79}$. Given a 4 microsecond orthogonal frequency division multiplexing (OFDM) symbol and a 20 MHz ADC sample rate, each packet/symbol will contain 80 samples. Recall that the processing control logic 130 counts samples in the sequence of samples to determine when the guard interval ends. The first 0.8 microseconds of the symbol corresponds to the guard interval. If there is no offset between the transmit timing signal and the ADC timing signal, the first 16 samples in the sequence correspond to the guard interval and the next 64 samples correspond to the data portion, which should be input to the FFT module. The unified control of packet processing and timing recovery described herein is applicable to any type of communication protocol that employs a guard interval or other aiding interval such that the data portion can be shifted to compensate for timing differences by the processing control logic 130.

When the shift signal is neutral, the processing control logic 130 determines that the data portion begins on the next sample after the predetermined number of samples corresponding to the guard interval has been counted (e.g., $d_{16}$). The data portion is determined to contain samples $d_{16}$-$d_{79}$. When the shift signal is left, the processing control logic 130 determines that the data portion begins on sample at which the predetermined number of samples corresponding to the guard interval has been counted (as opposed to the next sample) (e.g., $d_{15}$). The data portion is determined to contain samples $d_{15}$-$d_{78}$. When the shift signal is right, the processing control logic 130 will determine that the data portion begins at the second sample after the predetermined number of samples corresponding to the guard interval (e.g., $d_{17}$). The data portion is determined to contain samples $d_{16}$-$d_{80}$, where $d_{80}$ is $d_0$ from the prior symbol. In this manner, the processing control logic 130 adjusts which samples are identified as the data portion based on the phase offset. After shifting the location of the data portion, the processing control logic 130 sends a reset signal to the phase tracking logic 250 so that phase offset accumulation begins again with zero.

The shift signal and the phase offset generated by the phase tracking logic 250 are input to the timing recovery logic 140. The phase offset is input to a digital interpolator 260 that performs interpolation on a selection of consecutive data samples in the sequence of data samples to produce an interpolated sample that becomes a next member of the re-generated sample sequence $D_{out}$. In the embodiment of FIG. 2, six consecutive data samples D0-D5 are stored in a delay line. Each of the data samples in the delay line are input to a selector 270. The selector selects four consecutive samples from the six data samples to be input to the interpolator 260.

Any number n of samples could be stored in the delay line and a number m of samples selected as input to the interpolator 260. The number n is greater than m to allow the set of samples provided to the interpolator to be shifted to include an additional sample from a prior symbol (e.g. $d_0$ from the last packet) or to skip a sample (e.g., not include $d_{16}$ in the data portion) based on the phase offset. Note that rather than having a large buffer, only two more delay elements than the number of samples input to the interpolator are used.

The interpolator 260 interpolates the four samples based on the phase offset. In one embodiment, the interpolator is a low pass digital filter with tap coefficients that are changed based on the phase offset. Any digital interpolator could be used as long as the interpolator has sufficient performance characteristics. The interpolator 260 outputs the re-generated sample sequence $D_{out}$.

Figure 3:
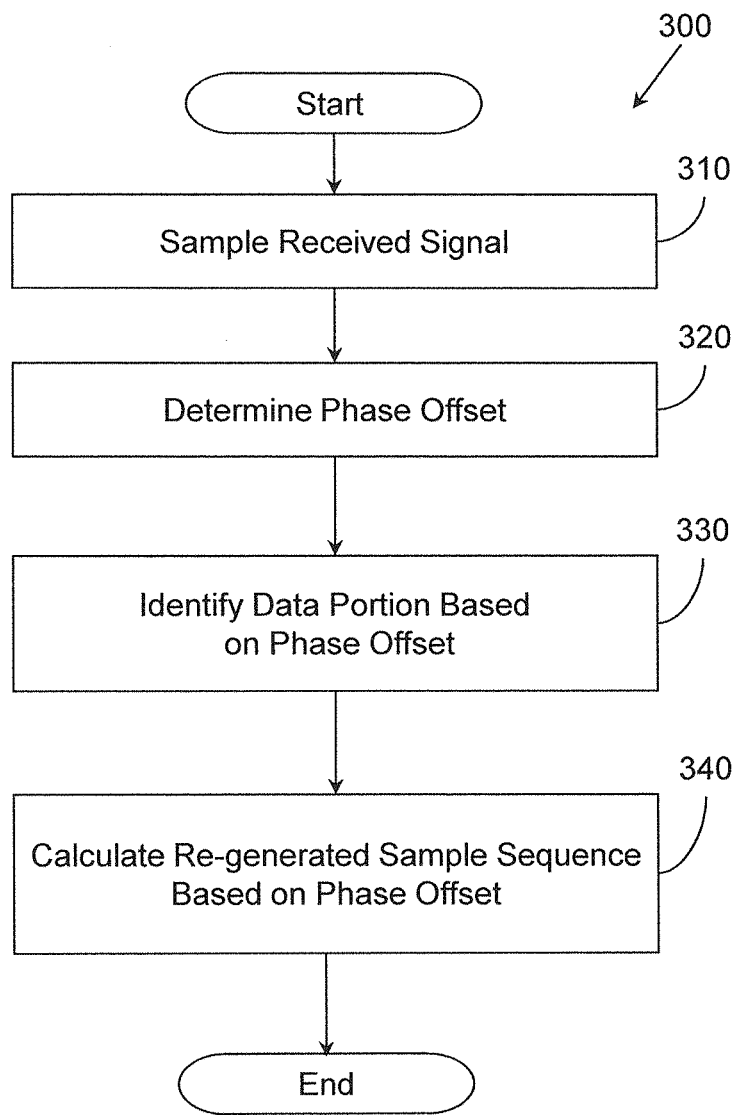
FIG. 3 illustrates one embodiment of a method for controlling digital timing recovery and packet processing based on the same phase offset.

FIG. 3 illustrates one embodiment of a method 300 for controlling both packet processing and digital timing recovery based on the same phase offset. The method 300 may be performed by the receiver 100 of FIG. 1. The method includes, at 310 sampling a received signal according to an ADC timing signal to produce a sequence of samples. The received signal corresponds to a packet. The received signal was transmitted according to a transmit timing signal. At 320, a phase offset between the ADC timing signal and the transmit timing signal is determined. At 330, the method includes identifying, based, at least in part, on the phase offset, a data portion of the sequence of samples that contains data encoded in the received signal. At 340, the method includes calculating a re-generated sample sequence that adjusts the data portion based on the phase offset.

Figure 4:
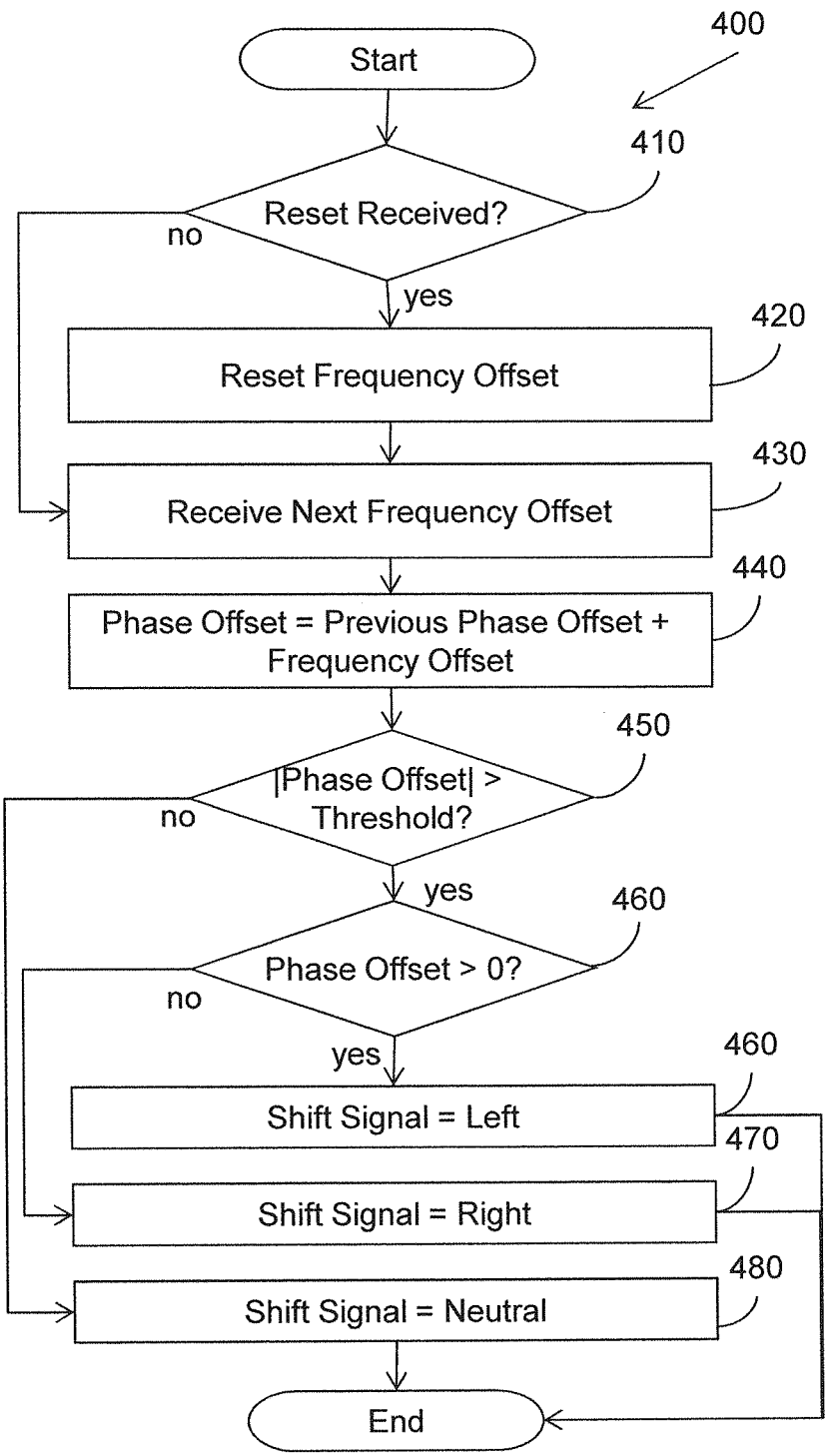
FIG. 4 illustrates one embodiment of a method for generating a shift signal based on phase offset.

FIG. 4 illustrates one embodiment of a method 400 for generating a shift signal used to control packet processing and timing recovery. The method 400 may be performed by the phase tracking logic 250 of FIG. 2. At 410, the method includes determining if a reset has been received (e.g., from the processing control logic 130 in FIG. 2). If a reset has been received, at 420 a frequency offset is reset to zero and the method continues to 430. At 430, the method includes receiving a next frequency offset estimate corresponding to a difference between an ADC timing signal and a transmit timing signal. At 440 the phase offset is determined by adding a prior phase offset to the frequency offset estimate. At 450, the method includes comparing a magnitude of the phase offset to a threshold. In one embodiment, the threshold is a full ADC clock cycle. If the magnitude of the phase offset does not exceed the threshold, at 480 a shift signal value of neutral is generated. If the magnitude of the phase offset exceeds the threshold at 460 a determination is made as to the sign of the phase offset. If the phase offset is positive, at 460 a shift signal value of left is generated. If the phase offset is negative, at 470 a shift signal value of right is generated. The shift signal is used by the unified control scheme to identify the data portion of a sequence of samples and to calculate the re-generated sample sequence.

Figure 5:
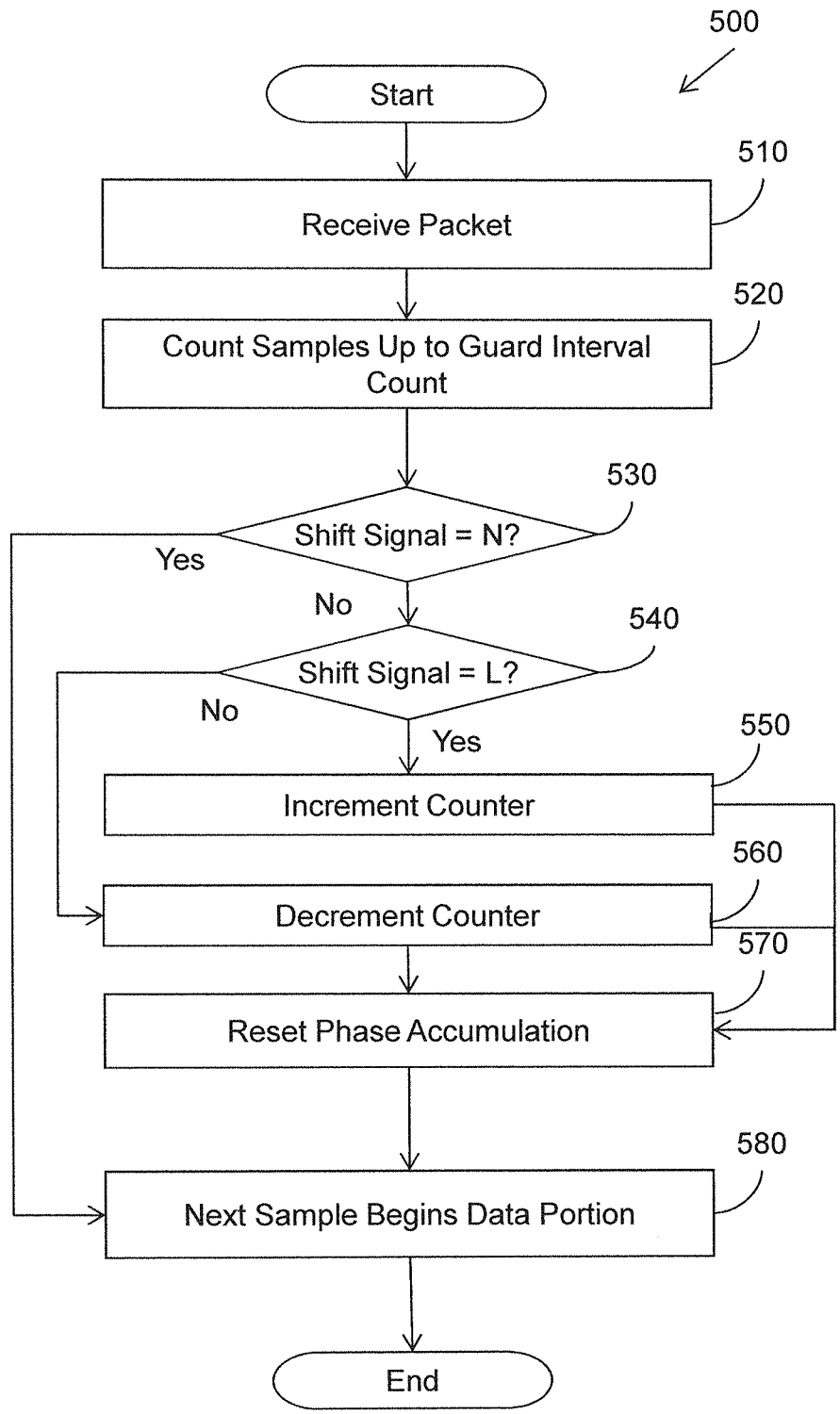
FIG. 5 illustrates one embodiment of a method for identifying a data portion of a sample sequence for a packet based on a shift signal.

FIG. 5 illustrates one embodiment of a method 500 for identifying the data portion of a packet based on a shift signal. The method 500 may be performed by the processing control logic 130 of FIGS. 1 and 2. The method includes, at 510, receiving samples corresponding to a packet. At 520, a counter is incremented for each sample until a count is reached that corresponds to the end of the guard interval. In FIG. 2, this would be a count of 16. At 530, a determination is made as to whether the shift signal is neutral. If the shift signal is neutral, no shift is necessary to capture the data portion and at 580 the next data sample is determined to be the beginning of the data portion. In FIG. 2, this would be data sample $d_{16}$.

If the shift signal has a value of left at 540, at 550 the counter is incremented. At 570, phase accumulation is reset to zero (e.g., a reset signal is sent to the phase tracking logic 250 of FIG. 2). At 580, the next data sample is determined to be the beginning of the data portion. Since the counter was incremented, the data portion is shifted left. In FIG. 2, the data portion would be determined to begin on sample $d_{17}$. If the shift signal has a value of right at 540, at 560 the counter is decremented. At 570, phase accumulation is reset to zero (e.g., a reset signal is sent to the phase tracking logic 250 of FIG. 2). At 580, the next data sample is determined to be the beginning of the data portion. Since the counter was decremented, the data portion is shifted right. In FIG. 2, the data portion would be determined to begin on sample $d_{15}$.

Figure 6:
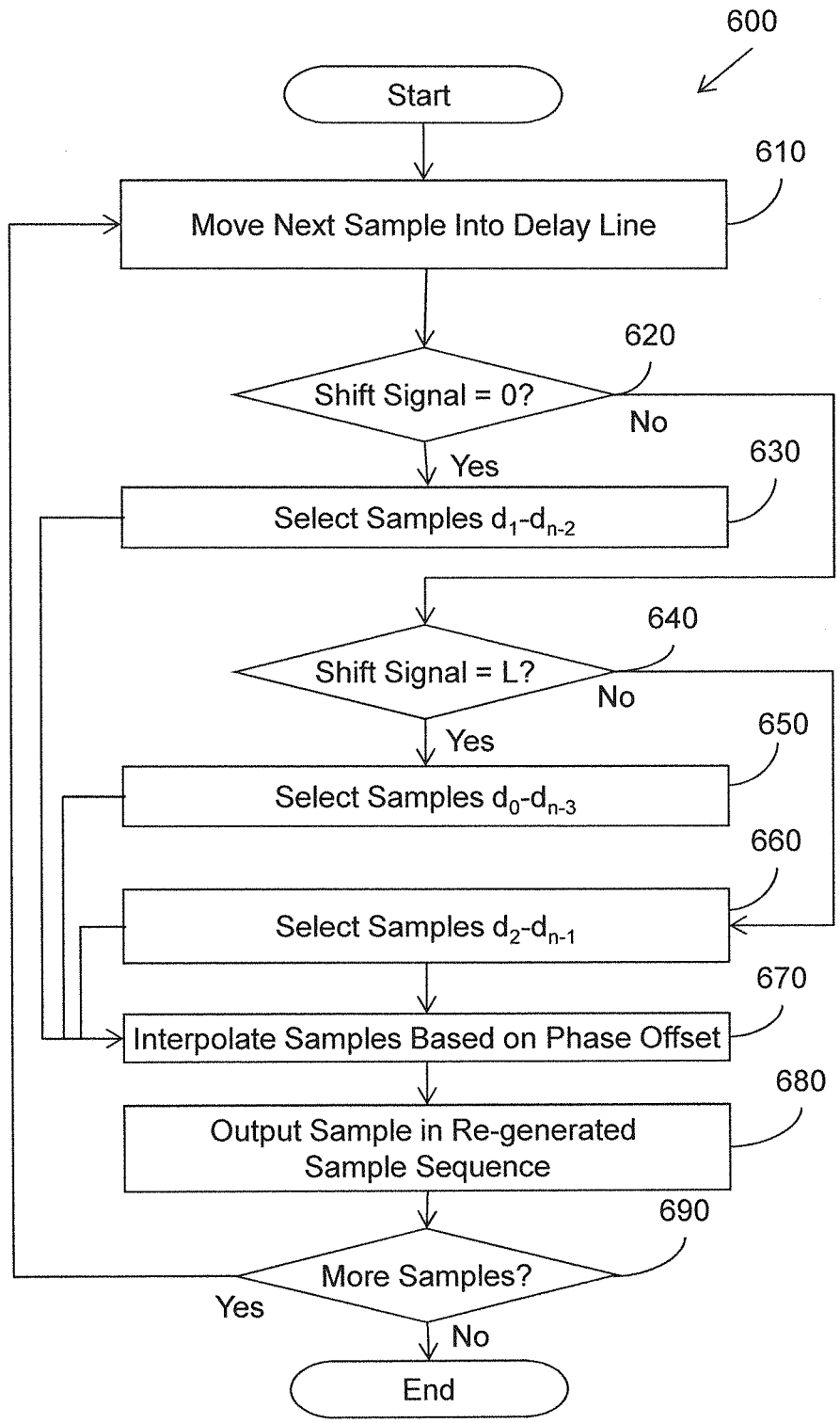
FIG. 6 illustrates one embodiment of a method for selecting samples from a delay line for interpolation.

FIG. 6 illustrates one embodiment of a method 600 that produces a re-generated sample sequence (e.g., $D_{out}$ in FIGS. 1 and 2) based on a shift signal. The method 600 may be performed by the timing recovery logic 140 of FIGS. 1 and 2. The method includes, at 610 moving a next sample in the data portion into a delay line that stores n consecutive samples $d_0$-$d_{n-1}$. At 620, a determination is made as to whether the shift signal has a value of neutral. When the shift signal is neutral, at 630, samples $d_1$-$d_{n-2}$ are selected. At 670, samples $d_1$-$d_{n-2}$ are interpolated based on the phase offset. At 680 the resulting interpolated data sample is output as part of a re-generated sample sequence. At 690, if there are remaining samples that have not yet been in the delay line, the method returns to 610.

Returning to 620, when the shift signal is not neutral, at 640, a determination is made as to whether the shift signal has a value of left or right. If the shift signal is left, at 650 samples $d_0$-$d_{n-3}$ are selected. At 670, samples $d_0$-$d_{n-3}$ are interpolated based on the phase offset. If the shift signal is right, at 660 samples $d_2$-$d_{n-1}$ are selected. At 670, samples $d_2$-$d_{n-1}$ are interpolated based on the phase offset. At 680 the interpolated data sample is output as part of a re-generated sample sequence. At 690, if there are remaining samples that have not yet been in the delay line, the method returns to 610. When there are no remaining data samples, the method ends.

Figure 7:
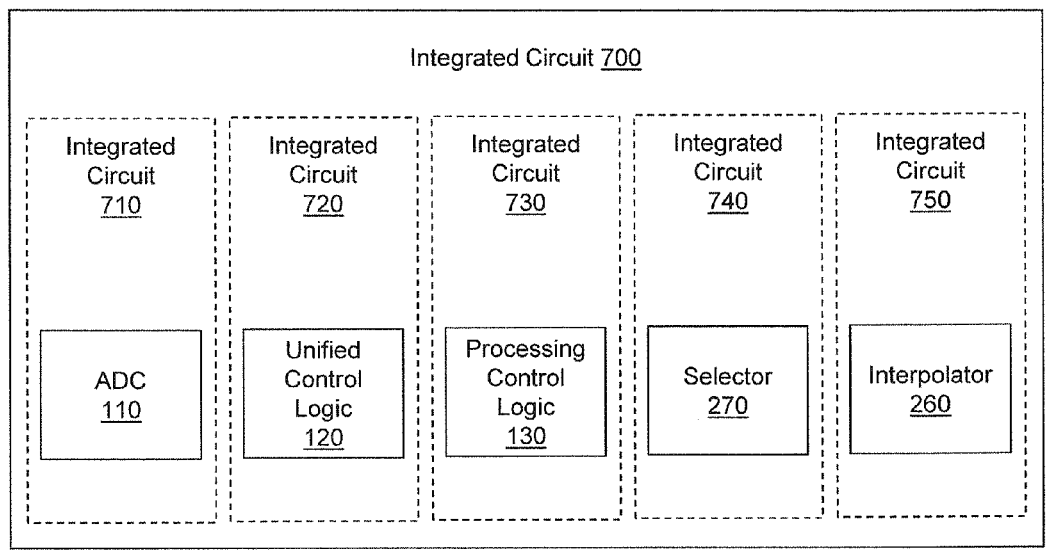
FIG. 7 illustrates one embodiment of an integrated circuit that provides unified control of timing recovery and packet processing.

FIG. 7 illustrates one embodiment of an integrated circuit 700 that provides unified control of timing recovery and packet processing. The integrated circuit 700 may be a system-on-chip or a component of a system-on-chip used in a wireless receiver. The integrated circuit 700 includes five integrated circuits. Of course, the functionality of one or more the five integrated circuits described herein may be combined into single integrated circuits or divided into two or more different integrated circuits. The input to the integrated circuit 700 is a signal that communicates encoded data corresponding to a series of packets with guard intervals. The output of the integrated circuit is a re-generated sample sequence that adjusts samples output by an ADC that samples the received signal. The samples are adjusted based on a phase difference between the receiver and the transmitter of the signal.

The integrated circuit 700 includes a first integrated circuit 710 that includes the ADC 110 of FIG. 1. The ADC 110 is clocked by a fixed ADC sampling clock to sample the received signal. The output of the ADC is a sequence of samples corresponding to a series of packets. The integrated circuit 700 includes a second integrated circuit 720 that implements the functionality of the unified control logic 120 of FIGS. 1 and 2. The unified control logic 120 accumulates a phase offset and generates a shift signal. The phase offset and shift signal are the outputs of the second integrated circuit and are used for packet processing and timing recovery. One input to the second integrated circuit is a frequency offset estimate that is calculated based on a carrier frequency offset determined with respect to the ADC sampling clock. The unified control logic 120 accumulates the frequency offset estimate to produce the phase offset. A second input to the second integrated circuit is a reset signal that restarts the accumulation of the phase offset.

The integrated circuit 700 includes a third integrated circuit 730 that implements the functionality of the processing control logic 130 of FIGS. 1 and 2. The processing control logic 130 identifies a data portion of a sequence of samples based, at least in part, on the shift signal from the unified control logic 120. The input to the processing control logic 130 is the shift signal from the unified control logic 120. The output of the processing control logic 130 is the data portion of the sequence of samples. Another output of the processing control logic is the reset signal to the unified control logic 120 to reset the phase accumulation. In one embodiment, the processing control logic 130 increments a counter for each sample in the sequence and identifies samples occurring after a number of samples corresponding to a guard interval as the data portion. After the number of guard interval samples is counted, the counter is adjusted up or down based on the shift signal.

The integrated circuit 700 includes a fourth integrated circuit 740 that implements the functionality of the selector 270 of FIG. 2. The input to the selector 270 is the shift signal. Based, on the shift signal, the selector 270 selects a set of consecutive data samples from a delay line. The output of the selector 270 is the set of consecutive data samples, which are used in interpolation. The integrated circuit 700 includes a fifth integrated circuit 750 that implements the functionality of the interpolator 260 of FIG. 2. The inputs to the interpolator 260 are the set of consecutive data samples received from the selector 270 and the phase offset from the unified control logic 250. The interpolator interpolates the set of consecutive data samples based on the phase offset to produce a re-generated sample for the re-generated sample sequence. The output of the interpolator 260 is the re-generated sample sequence.

As can be seen from the foregoing description, controlling both packet processing and timing recovery based on a phase offset determined with respect to a fixed sampling clock allows provides digital timing recovery without the burden of a second clock or large buffer.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium" as used herein is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage media may include, but are not limited to, a floppy disk, a flexible disk, a hard disk, a magnetic tape, other magnetic medium, an ASIC, a CD, other optical medium, a RAM, a ROM, a memory chip or card, a memory stick, and other electronic media that can store computer instructions and/or data. Computer storage media described herein are limited to statutory subject matter under 35 U.S.C. §101.

"Logic" as used herein includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C. §101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C. §101.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims, which satisfy the statutory subject matter requirements of 35 U.S.C. §101.

What is claimed is:

1. An apparatus, comprising:
an analog to digital converter (ADC) configured to sample a received signal according to an ADC timing signal to produce a sequence of samples, wherein the received signal corresponds to a packet, and wherein the received signal was transmitted according to a transmit timing signal;
unified control logic configured to:
  determine a phase offset between the ADC timing signal and the transmit timing signal by accumulating a difference between the ADC timing signal and the transmit timing signal;
  compare the phase offset to a threshold;
  generate a shift signal that is based on the comparison of the phase offset to the threshold;
processing control logic configured to identify based, at least in part, on the shift signal, a data portion of the sequence of samples that contains data encoded in the received signal; and
timing recovery logic configured to calculate a re-generated sample sequence that adjusts the data portion based, at least in part, on the shift signal;
wherein the unified control logic is further configured to provide the shift signal to the processing control logic and the timing recovery logic.

2. The apparatus of claim 1, wherein the shift signal can have a value of left, right, or neutral, and the phase tracking logic is configured to output a shift value of i) left when the phase offset is positive and exceeds the threshold, ii) right when the phase offset is negative and exceeds the threshold, and iii) neutral when the phase offset does not exceed the threshold.

3. The apparatus of claim 2, wherein the timing recovery logic comprises:
a delay line configured to store a number n consecutive samples of the data portion;
a selector configured to select a number m samples from the delay line based, at least in part, on the shift signal, where m is less than n; and
an interpolator configured to:
  interpolate the m data samples based on the phase offset; and
  output a resulting interpolated data sample;
  such that interpolated data samples output by the interpolator form the re-generated sample sequence.

4. The apparatus of claim 3, wherein:
the delay line holds samples $d_0$-$d_{n-1}$;
further wherein the selector is configured to:
  select samples $d_1$-$d_{n-2}$ when the shift signal is neutral;
  select samples $d_0$-$d_{n-3}$ when the shift signal is left;
  select samples $d_2$-$d_{n-1}$ when the shift signal is right.

5. The apparatus of claim 2, wherein the processing control logic is configured to:
increment a counter for each sample in a sequence of samples corresponding to a packet;
when the counter reaches a threshold count corresponding to a number of samples in a guard interval of the packet, further increment or decrement the counter based, at least in part, on the shift signal; and
identify samples having a higher count than the value of the counter as the data portion.

6. The apparatus of claim 5, wherein the processing control logic is configured to:

neither increment nor decrement the counter when the shift signal is neutral;
further increment the counter when the shift signal is left;
decrement the counter when the shift signal is right; and
when the counter is further incremented or decremented send a clear signal to the phase tracking logic that causes the phase tracking logic to reset the accumulation of phase offset to zero.

7. The apparatus of claim 1, wherein the ADC, the unified control logic, the processing control logic, and the timing control logic are all controlled by the ADC timing signal.

8. A method, comprising:
sampling a received signal according to an ADC timing signal to produce a sequence of samples, wherein the received signal corresponds to a packet, further wherein the received signal was transmitted according to a transmit timing signal;
determining a phase offset between the ADC timing signal and the transmit timing signal by accumulating a difference between the ADC timing signal and the transmit timing signal;
comparing the phase offset to a threshold;
generating a shift signal that is based on the comparison of the phase offset to the threshold;
identifying a data portion of the sequence of samples that contains data encoded in the received signal based, at least in part, on the shift signal; and
calculating a re-generated sample sequence that adjusts the data portion based, at least in part, on the shift signal.

9. The method of claim 8, wherein the shift signal can have a value of left, right, or neutral, and wherein generating the shift signal comprises generating a value of i) left when the phase offset is positive and exceeds the threshold, ii) right when the phase offset is negative and exceeds the threshold, and iii) neutral when the phase offset does not exceed the threshold.

10. The method of claim 9, wherein the calculating a re-generated sample sequence comprises:
storing a number n consecutive samples of the data portion in a delay line;
selecting a number m samples from the delay line based, at least in part, on the shift signal, where m is less than n; and
interpolating the m data samples based on the phase offset; and
outputting a resulting interpolated data sample;
such that interpolated data samples output by the interpolator form the re-generated sample sequence.

11. The method of claim 10, wherein the delay line holds samples $d_0$-$d_{n-1}$, and wherein the selecting comprises:
selecting samples $d_1$-$d_{n-2}$ when the shift signal is neutral;
selecting samples $d_0$-$d_{n-3}$ when the shift signal is left;
selecting samples $d_2$-$d_{n-1}$ when the shift signal is right.

12. The method of claim 9, wherein the identifying the data portion comprises:
incrementing a counter for each sample in a sequence of samples corresponding to a packet;
when the counter reaches a threshold count corresponding to a number of samples in a guard interval of the packet, further incrementing or decrementing the counter based, at least in part, on the shift signal; and
identifying samples having a higher count than the value of the counter as the data portion.

13. The method of claim 12, wherein the further incrementing or decrementing the counter based, at least in part, on the shift signal comprises:

neither incrementing nor decrementing the counter when the shift signal is neutral;
incrementing the counter when the shift signal is left;
decrementing the counter when the shift signal is right; and
sending a clear signal that causes the accumulation of phase offset to be reset to zero.

14. An integrated circuit device comprising:
an analog to digital converter (ADC) configured to:
  input a received signal that corresponds to a series of packets and was transmitted according to a transmit timing signal;
  sample the received signal according to an ADC timing signal; and
  output a resulting sequence of samples;
unified control logic configured to:
  input an estimated frequency offset between the ADC timing signal and the transmit timing signal;
  accumulate the frequency offset estimate with prior frequency offsets; and
  output i) a phase offset corresponding to the accumulated frequency offset and ii) a shift signal when the phase offset exceeds a threshold;
processing control logic configured to:
  input the shift signal;
  identify based, at least in part, on the shift signal, a data portion of the sequence of samples that contains data encoded in the received signal; and
  output the data portion to a delay line that stores a number n consecutive samples;
a selector configured to:
  input the shift signal;
  select a set of consecutive data samples from the delay line, based, at least in part, on the shift signal; and
  output the set of consecutive data samples; and
an interpolator configured to:
  input the phase offset and the set of consecutive data samples;
  interpolate the set of consecutive data samples based, at least in part on the phase offset to produce an interpolated data sample; and
  output the interpolated data sample as part of a re-generated sample sequence.

15. The device of claim 14, wherein the shift signal can have a value of left, right, or neutral, and the unified control logic is configured to output a shift value of i) left when the phase offset is positive, ii) right when the phase offset is, and iii) neutral when the phase offset does not exceed the threshold.

16. The device of claim 14 wherein the delay line holds samples $d_0$-$d_{n-1}$, and wherein the selector is configured to:
select samples $d_1$-$d_{n-2}$ when the shift signal is neutral;
select samples $d_0$-$d_{n-3}$ when the shift signal is left;
select samples $d_2$-$d_{n-1}$ when the shift signal is right.

17. The device of claim 14, wherein the processing control logic is configured to:
increment a counter for each sample in a sequence of samples corresponding to a packet;
when the counter reaches a threshold count corresponding to a number of samples in a guard interval of the packet, determine a value of the shift signal;
neither increment nor decrement the counter when the shift signal is neutral;
further increment the counter when the shift signal is left;
decrement the counter when the shift signal is right;
identify samples having a higher count than the value of the counter as the data portion;
and
when the counter is further incremented or decremented send a clear signal to the unified control logic that causes the unified control logic to reset the accumulation of phase offset to zero.

18. The device of claim 14 wherein the ADC, the unified control logic, the processing control logic, the selector, and the interpolator are all timing according to the same fixed clock signal.

* * * * *